Nov. 25, 1969     D. E. JEWELL ET AL     3,480,269
HYDRAULIC SUSPENSION UNIT
Filed Feb. 23, 1968     4 Sheets-Sheet 1

INVENTOR.
DAVID E. JEWELL
WILLIAM R. GIVENS
BY
Raymond Fink
ATTORNEY

Nov. 25, 1969  D. E. JEWELL ET AL  3,480,269
HYDRAULIC SUSPENSION UNIT
Filed Feb. 23, 1968  4 Sheets-Sheet 2

INVENTOR.
DAVID E. JEWELL
WILLIAM R. GIVENS
BY
Raymond Fink
ATTORNEY

INVENTOR.
DAVID E. JEWELL
WILLIAM R. GIVENS
BY
Raymond Fink
ATTORNEY

United States Patent Office 3,480,269
Patented Nov. 25, 1969

1

3,480,269
HYDRAULIC SUSPENSION UNIT
David E. Jewell, Littleton, Colo., and William R. Givens, Columbus, Ohio, assignors to The Gates Rubber Company, Denver, Colo., a corporation of Colorado
Filed Feb. 23, 1968, Ser. No. 707,781
Int. Cl. F16f 9/19, 9/50; B60g 17/04
U.S. Cl. 267—64                                    16 Claims

ABSTRACT OF THE DISCLOSURE

A hydraulic type suspension unit having a hydraulic control circuit comprising: a fluid reservoir, a pumping system, a high pressure chamber, interconnecting fluid passageways and flow regulating valves and seals. A suspension unit which provides the damping forces of a conventional shock absorber in addition to a hydraulic springing force and a load-leveling force which tends to maintain the suspension unit at a constant length.

This invention relates to suspensions and more particularly to hydraulic suspension units capable of performing three functions: (1) damping, (2 springing, and (3) self load-leveling.

The idea of containing (1) a shock absorber, (2) a spring, and (3) a self-leveling device in a single apparatus has been tried before. The problems involved with the prior art include fitting the suspension unit within the available space of an automotive vehicle, controlling the spring rate of the suspension unit within desirable limits, and controlling transitionary forces generated by the suspension unit as the external retraction and extension forces to the suspension unit are varied.

It is, therefore, the object of this invention to overcome the aforementioned difficulties by providing a hydraulic suspension unit, capable of being used within existing vehicle space limitations as a replacement unit such as for automotive vehicles and the like, while maintaining desirable spring rate and transitionary control. The fulfillment of this basic object required the employment of novel fluid control means within the suspension unit.

The suspension unit has three basic fluid chambers through which working fluid flow is precisely controlled by interconnecting passageways, seals and valving means. The three chambers are: (1) a fluid reservoir, (2) a pumping chamber, and (3) a high pressure chamber. A fluid passageway with a check valve therein permits one-way fluid flow from the fluid reservoir to the pumping chamber. The pumping chamber consists of a tubular cylinder, which is connected to a damping piston, and a reciprocating tubular piston. The tubular piston forms a fluid passageway to a one-way check valve at the entrance to the high pressure chamber. Damping forces are generated across an orificed damping piston when fluid is displaced within the high pressure chamber as the damping piston reciprocates relative to the high pressure chamber. The damping piston rod extends through the high pressure chamber and end closure and terminates as an extremity or mounting point for the unit. Fluid is pumped from the fluid reservoir to the high pressure chamber when the extremities of the suspension unit are reciprocated relative to each other such as would occur if the unit were installed on an automotive type vehicle.

Continued pumping action causes a differential surface area to be hydraulically forced to a predetermined neutral position whereby pumping is reduced to a minimum by by-passing the check valve to the high pressure chamber. Consequently, the unit assumes a neutral length when pumping is reduced to a minimum. The unit will exert an extension force at its neutral position corresponding to the compressive force being externally produced on the unit. Accordingly, when the unit is installed on an automotive vehicle, it will serve as a load-leveling device that will tend to maintain the automotive suspension system in its neutral position. Over-extension of the unit beyond the neutral position is controlled by a time-delay device. Removal of an external compressive force causes the unit to extend. As the unit extends, the damping piston loads a compression spring which applies a force against a highly damped floating piston located in the high pressure chamber. The floating piston activates a pressure relief valve that allows the working fluid to return to the fluid reservoir. Activation of the pressure relief valve results in reduced fluid pressure in the high pressure chamber. The spring and floating piston serve as a time-delay device to prevent normal reciprocating action of the unit from activating the pressure relief valve. The volume of the high pressure chamber is reduced when the damping piston-rod enters the high pressure chamber; the working fluid in the high pressure chamber is thereby compressed which results in a liquid spring force being exerted at the units' extremities. The details of this invention and the embodiments thereof may best be understood in conjunction with the drawings.

Figure 1:
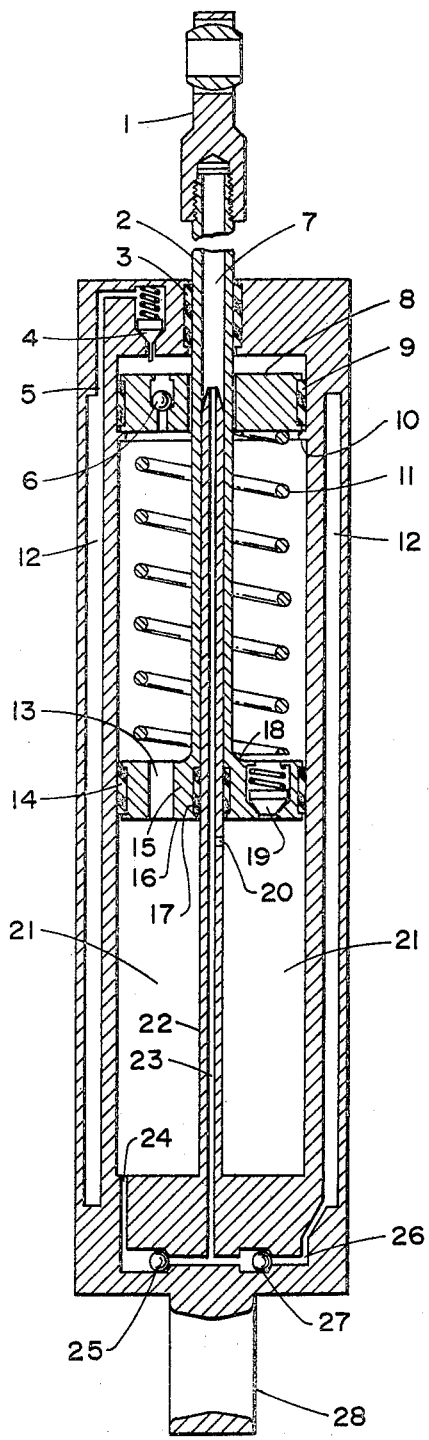
FIGURE 1 is an axial cross-section of a suspension unit embodying this invention showing the unit in its neutral length position.

Referring to FIGURE 1, the unit comprises three basic fluid working chambers: a fluid reservoir 12, a high pressure chamber 21, and a pumping chamber 7. The working fluid flows from the fluid reservoir 12 through passageway 26 and into the internal bore 23 of the fluid pumping piston 22. Check valve 27 allows only unidirectional fluid flow from the reservoir 12. The pumping chamber 7 is formed by the damping piston-rod 2 which has one end connected to the damping piston 15 and its other end attached to the upper physical mounting attachment 1. Fluid flow from the pumping chamber may enter the high pressure chamber 21 through the radial opening 20 or through passageway 24. Check valve 25 allows unidirectional fluid flow from the pumping chamber 7 to the high pressure chamber 21. Seal 17 and the radial opening 20 coact to form a pressure equalizing valve whose functioning is regulated by the relative location of the pumping chamber 7 with respect to the pumping piston 22. Damping forces are generated across the damping piston 15 by the damping orifice 13 and the jounce control valve 19. Seal 14 forces fluid to flow through the damping orifice 13 and the jounce valve 19 by preventing fluid flow around the periphery of the damping piston 15. Seal 3 minimizes fluid leakage from the high pressure chamber 21. The time-delay mechanism which controls fluid flow from the high pressure chamber 21 to the fluid reservoir 12 comprises the damping piston 15, the compression spring 11, retainer 10, floating piston 8, seal 9, check valve 6 and pressure relief valve 4. Operation of the time-delay mechanism is best understood in conjunction with the suspension unit in use.

When the suspension unit is in use, the attachment point 1 is secured to the sprung automotive mass whereas attachment point 28 is secured to the unsprung automotive mass. Reciprocatory motion between the two attachments causes the high pressure chamber 21 to be moved relative to the damping piston 15. If the automotive vehicle suspension is loaded, the damping piston 15 will be in the lower portion of the high pressure chamber 21 such that radial opening 20 will be sealed from the high pressure chamber 21 by the seal 17. As the lower portion of the high pressure chamber 21 moves away from damping piston 15, the pressure in the pumping chamber 7 will be reduced to below atmospheric thereby causing check valve 27 to open and permit fluid to flow from the reservoir 12 to the pumping chamber 7. When the motion of the damping piston reverses, check valve 27 will close and the fluid pressure in pumping chamber 7 will rise above the pressure in the high pressure chamber 21 causing check valve 25 to open and fluid to flow from the pumping chamber 7 to the high pressure chamber 21. As the reciprocatory motion continues, the pressure will rise in the high pressure chamber 21 causing attachment point 28 to move away from the damping piston 15 because surface area 16 is larger than surface area 18. Pumping action will cease when the damping piston 15 has reached a relative position such that seal 17 slides past the radial opening 20 whereby there is direct hydraulic communication between the pumping chamber 7 and the high pressure chamber 21. Should the damping piston 15 be in the upper portion of the pressure chamber 21, the spring 11 will exert a force against the floating piston 8 causing fluid to be slowly displaced through the annular clearance between the damping piston-rod 2 and the floating piston 8. The floating piston 8 will activate the pressure relief valve 4 and fluid will flow into passageway 5 to the reservoir 12. Check valve 6 allows the floating piston 8 to rapidly return to its neutral position against the retainer 10. The relief valve 4 may also be activated by high fluid pressure that would affect the structural integrity of the high pressure chamber 21.

Figure 2:
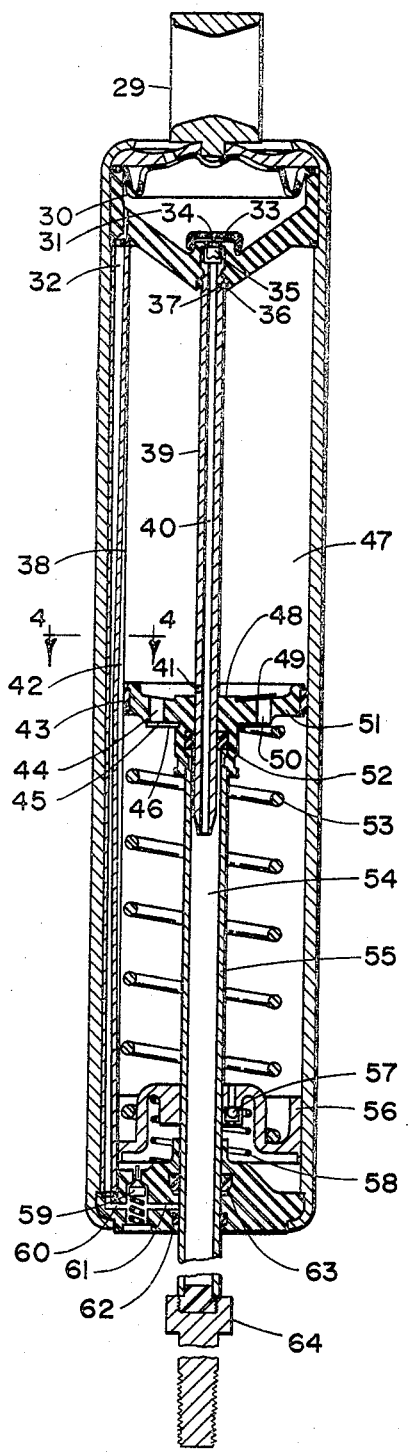
FIGURE 2 is a similar axial cross-section through a second form of suspension unit embodying this invention.
Figure 3:
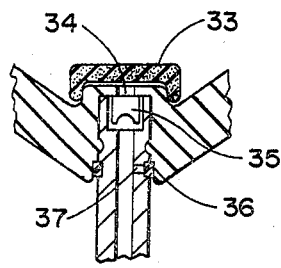
FIGURE 3 is an enlarged view partially in section of the suspension unit of FIGURE 2.
Figure 4:
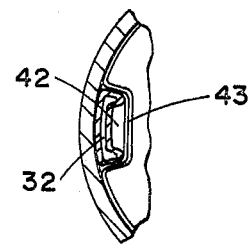
FIGURE 4 is a view in section taken along the line 4—4 of FIGURE 2.

The suspension unit depicted by FIGURES 2, 3 and 4 is exemplary of another embodiment of this invention having the same, novel, hydraulic control circuit as previously explained. The suspension unit as shown will operate in any attitude; only one attitude is shown for ease of description. The unit comprises three basic fluid working chambers: a fluid reservoir 31, a high pressure chamber 47 and a pumping chamber 54. The fluid reservoir 31 has an elastomeric member 30 that adjusts to variable fluid volumes while maintaining reservoir pressure at approximately atmospheric, and precluding an oil-air interface. Working fluid flows from the fluid reservoir 31 through filter 33, through passageway 34 and into the internal bore 40 of the fluid pumping piston 39. Check valve 35 allows only unidirectional fluid flow from the reservoir 31. The pumping chamber 54 is formed by the damping piston-rod 55 which has one end connected to the damping piston 51 and the other end attached to the lower physical mounting attachment 64. Fluid flow from the pumping chamber may enter the high pressure chamber 47 through radial opening 41 or through the check valve comprising radial opening 37 and the annular elastomeric seal 36; the check valve allows unidirectional fluid flow from the pumping chamber 54 to the high pressure chamber 47. Seal 52 and radial opening 41 coact to form a pressure equalizing valve whose functioning is regulated by the relative location of the pumping chamber 54 with respect to the pumping piston 39. Damping forces are generated across the damping piston 51 by the variable damping orifice 42; the jounce control valve comprising passageway 44 and flapper member 45; and the rebound control valve comprising passageway 50 and flapper member 49. Stroke sensitive damping is achieved by the variable orifice 42. The orifice area varies along the length 38 of the high pressure chamber 47. However, the damping orifice 42 may be made so large that a suspension unit having relatively no damping may be achieved. Seal 43 restricts fluid flow around the periphery of the damping piston 51. The high pressure seal 63 minimizes fluid leakage from the high pressure chamber 47 whereas low pressure seal 62 minimizes external fluid leakage. Any leakage past the high pressure seal 63 is channeled back to the reservoir through passageway 61. The time-delay system which controls fluid flow from the high pressure chamber 47 to the fluid reservoir 31, comprises a piston 51, a compression spring 53, a floating piston 56, a check valve 27, a return spring 58, and a relief valve 59. Floating piston 56 separates the high pressure chamber into a primary and secondary chamber, the secondary chamber being that chamber that contains spring 58. Operation of the time-delay system is best understood in conjunction with the suspension unit while in use.

When the suspension unit is in use, the attachment point 29 is secured to the sprung automotive mass whereas attachment point 64 is secured to the unsprung automotive mass. Reciprocatory motion between the two attachments causes the damping piston 51 to be moved relative to the high pressure chamber 47. If the automotive vehicle suspension is loaded, the damping piston 51 will be in the upper portion of the high pressure chamber 47 such that radial opening 41 will be sealed from the high pressure chamber 47 by the seal 52. As the damping piston 51 moves toward the lower portion of the high pressure chamber 47, the pressure in the pumping chamber 54 will be reduced to below atmospheric thereby causing check valve 35 to open and permit fluid to flow from the reservoir 31 to the pumping chamber 54. When the motion of the damping piston 51 reverses, check valve 35 will close and the fluid pressure in the pumping chamber 54 will rise above the pressure in the high pressure chamber 47 causing the check valve, which comprises opening 37 and seal 36, to open and fluid to flow from the pumping chamber 54, to the high pressure chamber 47. As the reciprocatory motion continues, the pressure will rise in the high pressure chamber 47 causing damping piston 51 to move away from attachment point 29 because surface area 48 is larger than surface area 46. Pumping action will cease when the damping piston 51 has reached a relative position such that seal 52 slides past the radial opening 41 whereby there is direct hydraulic communication between the pumping chamber 54, and the high pressure chamber 47. Should the damping piston 51 be in the lower portion of the high pressure chamber 47, the spring 53 will exert a force that moves floating piston 56 causing fluid to be slowly displaced through the annular clearance between the damping piston-rod 55 and the floating piston 56. Slow displacement of the fluid through the annular area results in the floating piston 56 moving slowly toward the pressure relief valve 59. Physical contact between the floating piston 56 and the pressure relief valve 59 activates said valve 59 causing fluid to flow into passageway 60, through passageway 32, and back to the reservoir 31. Check valve 57 and spring 58 coact to permit the rapid movement of floating piston 56 away from pressure relief valve 59. The relief valve 59 may also be activated by high fluid pressure that would affect the structural integrity of the high pressure chamber 47.

When the damping piston-rod 55 enters the high pressure chamber 47, the effective volume of said chamber 47 is reduced by a volumetric amount equal to the volume displaced by the rod 55 as it enters said chamber 47. Accordingly, the fluid contained in the high pressure chamber 47 is compressed. The fluid resists compression in accordance with its bulk modulus and the fluid acts as a liquid spring. The liquid spring force is exerted at the upper 29 and lower 64 extremities of the suspension unit.

Figure 5:
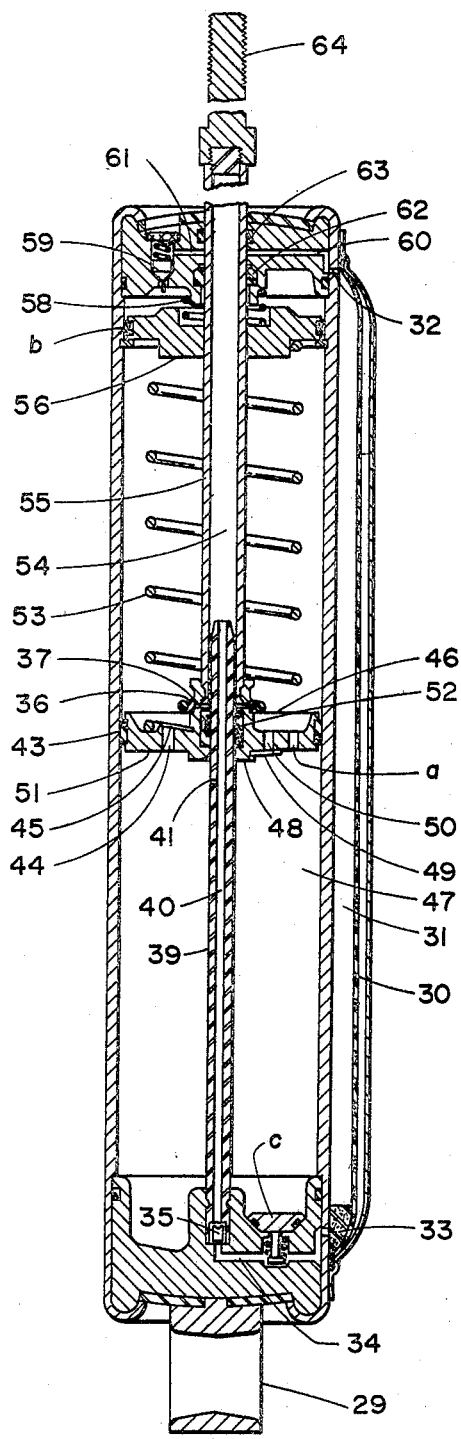
FIGURE 5 is an axial cross-section of a modified version of the suspension unit of FIGURE 2.

Another embodiment of this invention is depicted by FIGURE 5. The suspension unit as shown in FIGURE 5 is a modified version of the suspension unit as shown by FIGURE 2. Both suspension units employ the same basic hydraulic control circuit. The same reference characters have been used to identify the same component parts in FIGURES 2 and 5. Accordingly, the component parts description for FIGURE 2 is applicable to the component parts description for FIGURE 5.

The modifications depicted by FIGURE 5 are primarily a reorientation of component parts. Component part variations are identified with alpha characters for clarity. The suspension unit modifications as depicted by FIGURE 5 comprise: relocation of the fluid reservoir 31 to the side of the suspension unit, relocation of the radial opening 37 and the elastomeric seal 36, replacement of the variable orifice with a constant orifice $a$, replacement of the check valve with the elastomeric check valve-seal combination $b$, and the incorporation of a rebound replenishing valve $c$. The suspension unit has also been rotated 180° to emphasize the capability of the unit to operate in any attitude.

The only new element incorporated in the embodiment of this invention is the rebound replenishing valve $c$. The replenishing valve $c$ functions only when a rapid extension of the suspension unit causes the pressure in the high pressure chamber 47 near the valve $c$ to drop below the pressure of the fluid in the fluid reservoir 31. The purpose of the replenishing valve is to prevent fluid cavitation in the high pressure chamber 47.

Figure 6:
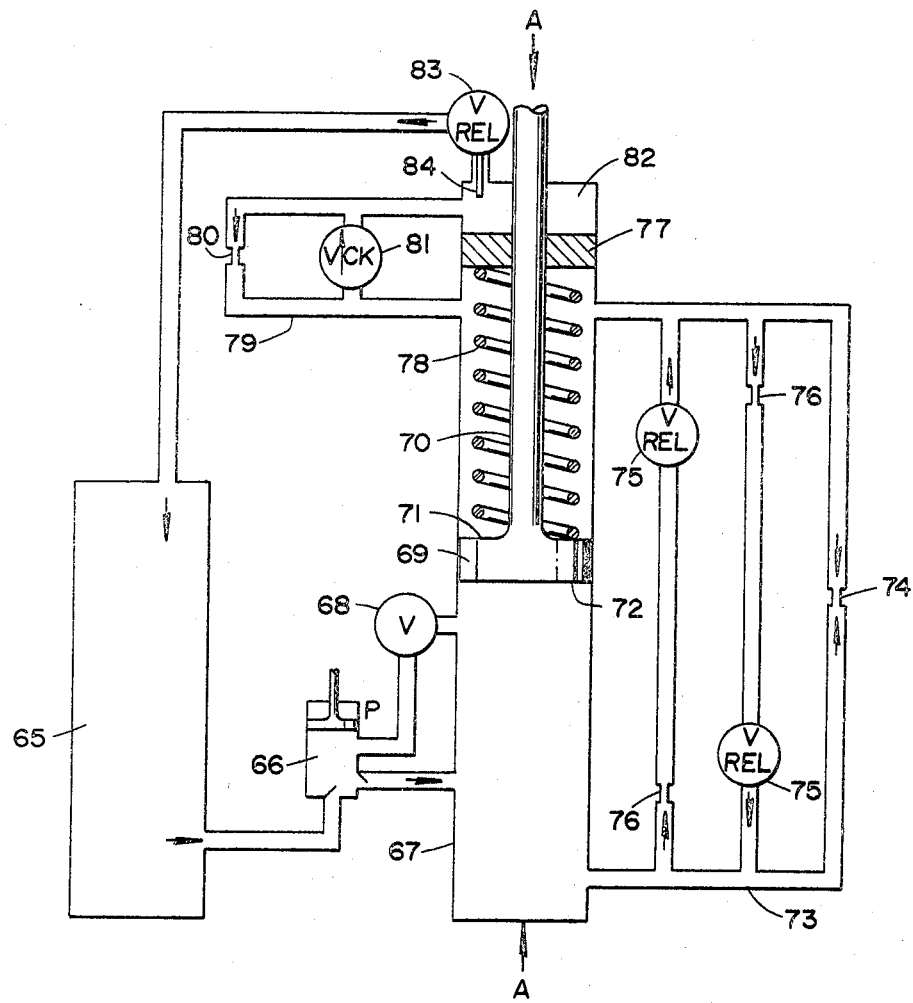
FIGURE 6 is a schematical representation of the hydraulic circuitry employed in the suspension unit.

Referring to FIGURE 6, the hydraulic circuitry comprises fluid working chambers interconnected with fluid passageways and fluid control means. A hydraulic working fluid is drawn from the fluid reservoir 65 during the intake stroke of the pump 66 and distributed to the high pressure chamber 67 during the discharge stroke of the pump 66. The pump 66 converts reciprocatory mechanical energy into hydraulic potential energy by raising the fluid pressure in the high pressure chamber 67. When the fluid pressure in the high pressure chamber has attained an operable pressure, a valve 68, opens to permit direct hydraulic communication between the pump 66 and high pressure chamber 67 which results in deactivation of the pump 66. A piston 69 attached to a rod 70 reciprocates in the high pressure chamber 67. The piston 69 and rod 70 are such that surface area 71 is smaller than surface area 72; the differential surface area corresponds to the cross-sectional area of the rod 70. A compressive force AA applied to the rod 70 and high pressure chamber 67 is hydraulically balanced by the high pressure fluid reacting on the differential surface area. Damping of the reciprocating piston 69 is hydraulically controlled by a circuit 73 comprising series-parallel orifices and relief valves.

Normal damping forces, responsive to reciprocatory movements of the piston 69, are generated across an orifice 74. The orifice 74 may be a variable or constant orifice depending on whether variable or fixed damping is desired. When the reciprocatory velocity of the piston becomes quite high, a check valve 75 will open allowing damping forces to be generated across an orifice 76. Two check valves 75 and two orifices 76 are shown; however, a plurality of such valves and orifices may be incorporated to achieve a desired damping effect that is responsive to the reciprocatory velocity of the piston 69.

Should the compressive load AA be reduced or removed, piston 69 will be hydraulically forced toward the floating piston 77. Such piston 69 movement will load the compressive spring 78 which in turn will apply a force against the floating piston 77. The location of the floating piston 77 is such that a secondary chamber 82 is formed within the high pressure chamber 67. Movement of the floating piston 77 is influenced by the hydraulic circuit 79 which circuit 79 comprises orifice 80 and check valve 81 arranged in a parallel manner. Movement of the floating piston 77 toward the relief valve 83 is highly damped through orifice 80 whereas quick movement of the floating piston 77 away from the relief valve 83 is permitted by check valve 81. Relief valve 83 may be actuated by high fluid pressure or the mechanical link 84. Actuation of the relief valve 83 results in hydraulic fluid being returned to the fluid reservoir 65.

Figure 7:
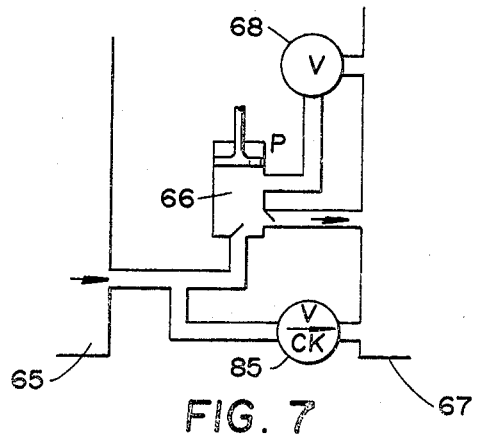
FIGURE 7 is a modification of the hydraulic circuitry as shown by FIGURE 6.

Referring to FIGURE 7, the hydraulic circuit of FIGURE 6 has been slightly modified by the incorporation of a check valve 85. The check valve 85 permits fluid flow to be circumvented around the pump 66 when the fluid pressure in the high pressure chamber 67 drops below the fluid pressure in the fluid reservoir 65. Incorporation of the check valve 85 precludes the possibility of fluid cavitation in the high pressure chamber 67.

The foregoing description is illustrative of just three of many embodiments within the scope of this invention. It is to be understood that other forms may be adopted.

What is claimed is as follows:

1. A hydraulic control circuit containing hydraulic working fluid, said control circuit supplying springing and load-leveling hydraulic forces to extensible and non-extensible members of a suspension unit, said control circuit comprising:
    (a) a fluid-containing reservoir,
    (b) a positive displacement reciprocating pump activated by relative motion between suspension unit extremities,
    (c) a fluid passageway between said reservoir and pump wherein said passageway contains a one-way check valve to control unidirectional fluid flow to the pump,
    (d) a fluid receiving, variable volume, high pressure chamber, said variable volume capable of providing a hydraulic spring effect when used with a working fluid,
    (e) a fluid passageway between said pump and said high pressure chamber wherein said passageway contains a one-way check valve to control unidirectional fluid flow to the high pressure chamber,
    (f) a pressure equalizing valve between the pump and high pressure chamber, said valve capable of diverting fluid flow around the one-way check valve located between the pump and high pressure chamber, with such diversion thereby deactivating said pump,
    (g) a hydraulic reacting, load-leveling surface defining a working area on the extensible member of the suspension unit wherein the working area is defined by the cross-sectional area of the protruding extensible member of the suspension unit when the pump is deactivated, and
    (h) a fluid passageway between the fluid receiving high pressure chamber and the fluid reservoir wherein said passageway contains a pressure relief valve to control fluid pressure within the high pressure chamber and to control the unidirectional fluid flow to the fluid reservoir.

2. A hydraulic control circuit according to claim 1 wherein said control circuit contains a hydraulic control circuit to supply damping forces to extensible and non-extensible members of the suspension unit; said circuit comprising at least one damping orifice that restricts fluid displacement within the high pressure chamber when said extensible members of the suspension unit are subjected to reciprocal movement.

3. A hydraulic control circuit according to claim 2 wherein said control circuit contains a pressure decay hydraulic circuit to control the fluid pressure decay of the high pressure chamber through the pressure relief valve said pressure decay circuit comprising: a variable volume secondary chamber within the high pressure chamber which volume varies according to the relative position of the extensible member with respect to the non-extensible member; a passageway between the high pressure and secondary chambers, said passageway containing a one-way check valve to allow rapid fluid flow from the high pressure chamber to the secondary chamber; and a passageway between the high pressure and secondary chambers, said passageway containing an orifice to allow only slow fluid flow from the secondary chamber to the high pressure chamber.

4. A hydraulic control circuit according to claim 1 wherein said hydraulic control circuit contains a hydraulic damping circuit to supply variable damping forces to extensible and non-extensible members of a vehicle suspension unit, said hydraulic damping circuit comprising a variable damping orifice that restricts fluid displacement in the high pressure chamber when the extensible member of the suspension unit is reciprocated.

5. A hydraulic control circuit according to claim 4 wherein said hydraulic control circuit contains a pressure decay hydraulic circuit to control the fluid pressure decay of the high pressure chamber through the pressure relief valve wherein said pressure decay circuit comprises: a variable volume secondary chamber within the high pressure chamber which volume varies according to the relative position of the extensible member with respect to the non-extensible member; a passageway between the high pressure and secondary chambers, said passageway containing a one-way check valve to allow rapid fluid flow from the high pressure chamber to the secondary chamber; and a passageway between the high pressure and secondary chambers; said passageway containing an orifice to allow only slow fluid flow from the secondary chamber to the high pressure chamber.

6. A hydraulic control circuit according to claim 1 wherein said hydraulic control circuit contains a check valve between the fluid reservoir and high pressure chamber.

7. A hydraulic suspension unit having relative reciprocating extremities, said unit supplying damping, springing and load-leveling forces between said relative reciprocating extremities, said unit comprising:
  (a) a fluid reservoir,
  (b) a pumping chamber,
  (c) interconnecting passageway between the fluid reservoir and pumping chamber,
  (d) a high pressure chamber,
  (e) interconnecting passageways between the pumping chamber and the high pressure chamber,
  (f) a damping piston located within the high pressure chamber,
  (g) valving means for controlling fluid flow from the reservoir, through the pumping chamber and into the high pressure chamber,
  (h) valving means for monitoring fluid flow from the high pressure chamber back to the fluid reservoir,
  (i) a pumping means which communicates between the fluid reservoir and the high pressure chamber, and
  (j) sealing means to maintain operational pressures.

8. A suspension unit according to claim 7 wherein the valving means (g) for controlling fluid flow through the pumping chamber is an assembly comprising:
  (a) a one-way check valve located between the fluid reservoir and the pumping chamber,
  (b) a one-way check valve located between the pumping chamber and the high pressure chamber, and
  (c) a pressure equalizing valve comprising:
    (1) the sealing means between the pumping means and the high pressure chamber, and
    (2) the pumping chamber.

9. A suspension unit according to claim 8 wherein the sealing means between the pumping means and the high pressure chamber is a labyrinth seal.

10. A suspension unit according to claim 7 wherein the damping piston contains at least one pressure responsive blow-off valve capable of stabilizing the damping effect of said piston.

11. A suspension unit as claimed in claim 7 wherein the valving means between the high pressure chamber and fluid reservoir comprises a floating piston in the high pressure chamber, a spring between the damping piston and floating piston, and a pressure relief valve which is activated by either high fluid pressure or the floating piston acting in conjunction with the spring and damping piston.

12. A hydraulic suspension unit having relative reciprocating mounting extremities, said unit designed to supply damping, springing and load-leveling forces between said relative reciprocating mounting extremities, said unit comprising:
  (a) two concentric tubes with upper and lower end closures defining an annular volume constituting a fluid reservoir, and the inner tube defining the exterior wall of a high pressure chamber,
  (b) a damping piston which reciprocates within the high pressure chamber, said piston being attached to a rod having a concentric bore which bore defines a pumping chamber, said rod extending through the upper end closure,
  (c) a tube affixed to the lower end closure and of a smaller diameter than that of said lower end closure, said tube defining a pumping piston that protrudes into the pumping chamber, said tube having a radial opening disposed into said high pressure chamber when the damping piston is toward the upper end of the high pressure chamber, and said radial opening sealed from the high pressure chamber, by the damping piston when the damping piston is toward the lower end of the high pressure chamber,
  (d) valving means, located in the upper end and lower end closures, capable of controlling hydraulic communication between the fluid reservoir, pumping chamber and high pressure chamber,
  (e) sealing means between the damping piston and high pressure chamber and between the pumping piston and damping piston, and
  (f) a time-delay mechanism comprising a valving means, a floating piston, a mechanical spring and a damping piston.

13. A hydraulic suspension unit having relative reciprocating mounting extremities, said unit designed to supply damping, springing and load-leveling forces relative to said units' reciprocating extremities, said unit comprising:
  (a) a cylindrical tube having a recessed first end closure and a second end closure containing a confined volume which constitutes a high pressure chamber,
  (b) a damping piston capable of reciprocating within the high pressure chamber, said piston affixed to a rod having a concentric bore, said bore defining a pumping chamber, said rod extending through said second end closure,
  (c) a tube having a diameter less than the diameter of the first end closure affixed to said first end closure, said tube forming a pumping piston that protrudes into the pumping chamber, said tube having a radial opening which opens to the high pressure chamber when the damping piston is toward one end of the high pressure chamber, and which radial opening is sealed from the high pressure chamber by the damping piston when the damping piston is toward the first end closure of the high pressure chamber,
  (d) a third end closure above the recessed first end closure wherein said closures, and said cylindrical tube, define a fluid reservoir,
  (e) valving means located in the first recessed end closure and the second end closure, said valving means providing controlled hydraulic communication between the fluid reservoir, pumping chamber and high pressure chamber,
  (f) sealing means between the damping piston and high pressure chamber and between the pumping piston and damping piston, (g) a time-delay means to control fluid pressure decay in the high pressure chamber wherein said means comprises: a spring responsive to unidirectional movements between said mounting extremities, a floating piston responsive to forces induced by said spring, a relief valve to control fluid flow to said reservoir, said relief valve being actuated by said floating piston, a return spring to return said floating piston, and (h) a variable damping orifice to control fluid displacement around the damping piston as said piston reciprocates within said high pressure chamber.

14. A suspension unit according to claim 13 wherein a constant damping orifice replaces the variable damping orifice.

15. A suspension unit according to claim 13 having valving means in the damping piston to control jounce and rebound damping.

16. The method of simultaneously providing damping, springing and load-leveling forces to first and second extremities of a hydraulic suspension unit as activated by jounce and rebound movements which activate a hydraulic control circuit, said method comprising:

(a) pumping a hydraulic fluid from a fluid reservoir to a high pressure chamber with a positive displacement pump, said pump being activated by reciprocatory motion between first and second extremities of the suspension unit, (b) increasing the fluid energy level in the high pressure chamber by raising the fluid pressure in the high pressure chamber with said positive displacement pump, (c) damping a reciprocating piston in the high pressure chamber by fluid displacement through a plurality of orifices and relief valves, said piston being affixed to a protruding extremity of the suspension unit, (d) reacting a movable differential surface area as affixed to the protruding extremity of the suspension unit, with high energy fluid in the high pressure chamber such that a nominal length is assumed between the suspension unit extremities and wherein assumption of a nominal length results in an extension force that counteracts a compressive force as applied to said first and second extremities of the suspension unit, (e) deactivating the pump by opening a valve that permits direct hydraulic communication between the pump and the high pressure chamber when the suspension unit assumes a nominal length between said first and second extremities, (f) compressing the fluid in the high pressure chamber to react as a spring at the extremities of the suspension unit when the protruding extremity is moved to a physical position that tends to shorten the nominal length of the suspension unit, (g) decreasing the fluid energy in the high pressure chamber through a pressure relief valve that permits unidirectional fluid flow from the high pressure chamber to the fluid reservoir when the fluid pressure in the high pressure chamber attains a level that affects the structural integrity of the suspension unit, and (h) decreasing the fluid energy in the high pressure chamber in a time-delayed manner by mechanically activating the pressure relief valve, that permits unidirectional fluid flow from the high pressure chamber to the fluid reservoir, when the suspension unit assumes a greater than nominal length, as would occur when the compressive load to the suspension unit extremities is reduced.

References Cited

UNITED STATES PATENTS

| 3,074,708 | 1/1963 | Lush et al. | 267—64 |
| 3,076,643 | 2/1963 | Bittel | 267—64 |
| 2,879,057 | 3/1959 | Heiss | 267—64 |
| 3,430,977 | 3/1969 | Riehl | 267—64 |

JAMES B. MARBERT, Primary Examiner

U.S. Cl. X.R.

280—124